US008810581B2

(12) United States Patent
Wun et al.

(10) Patent No.: US 8,810,581 B2
(45) Date of Patent: *Aug. 19, 2014

(54) CHARACTER INPUT METHOD

(75) Inventors: Archer Chi Kwong Wun, Maple (CA); Kwok Ching Leung, Richmond Hill (CA)

(73) Assignee: Blackberry Limited, Waterloo (CA)

( * ) Notice: Subject to any disclaimer, the term of this patent is extended or adjusted under 35 U.S.C. 154(b) by 438 days.

This patent is subject to a terminal disclaimer.

(21) Appl. No.: 12/908,400

(22) Filed: Oct. 20, 2010

(65) Prior Publication Data

US 2012/0098846 A1   Apr. 26, 2012

(51) Int. Cl.
G06T 11/00 (2006.01)
G06F 17/20 (2006.01)
G06F 17/28 (2006.01)

(52) U.S. Cl.
USPC ............ 345/467; 345/469; 704/1; 704/2; 704/3; 704/7; 704/8

(58) Field of Classification Search
CPC ........... G06F 3/04886; G06F 2203/04101; G06F 17/275
USPC ................ 345/467–469; 704/1–8
See application file for complete search history.

(56) References Cited

U.S. PATENT DOCUMENTS

| 6,847,350 | B2 | 1/2005 | Van Brocklin et al. | |
|---|---|---|---|---|
| 7,013,258 | B1 * | 3/2006 | Su et al. | 704/1 |
| 7,298,362 | B2 | 11/2007 | Wang | |
| 7,561,146 | B1 | 7/2009 | Hotelling | |
| 8,390,569 | B2 * | 3/2013 | Stenmark et al. | 345/157 |
| 2004/0017946 | A1 | 1/2004 | Longe | |
| 2009/0283341 | A1 | 11/2009 | Lin | |
| 2009/0295737 | A1 | 12/2009 | Goldsmith | |
| 2010/0090945 | A1 | 4/2010 | Lee | |
| 2011/0291988 | A1 * | 12/2011 | Bamji et al. | 345/175 |

FOREIGN PATENT DOCUMENTS

| WO | 0145034 A1 | 6/2001 |
|---|---|---|
| WO | 01/95041 A1 | 12/2001 |
| WO | 2009074278 A1 | 6/2009 |

OTHER PUBLICATIONS

Extended European Search Report mailed Mar. 10, 2011. In corresponding application No. 10188268.6.
Wikipedia, Palm OS, http://en.wikipedia.org/wiki/Palm_OS, Nov. 20, 2009.
Wikipedia, Handwriting recognition, http://en.wikipedia.org/wiki/handwriting_recognition. Jan. 20, 2010.

(Continued)

*Primary Examiner* — Xiao Wu
*Assistant Examiner* — Matthew D Salvucci
(74) *Attorney, Agent, or Firm* — Novak Druce Connolly Bove + Quigg LLP

(57) ABSTRACT

A system, method and apparatus are described herein for input of characters into a mobile device. In one implementation, a user can input representations of character strokes of logographic characters, such as Chinese characters, using a trackpad module. The system can then associate the character strokes with a character the user desires to input based on the received inputs and a series of well-known rules for writing the logographic characters. One implementation of the trackpad includes an optical trackpad comprising a plurality of sub-sections that can be used to determine the direction of movement of an object over the optical trackpad, for example, a finger over the optical trackpad.

23 Claims, 12 Drawing Sheets

(56) References Cited

OTHER PUBLICATIONS

China Guide Corporation, Computer Chinese Language Support: Chinese Input Method, Scanning, http://china-guide.com/software/ocr.html, Mar. 24, 2010.

Meizu M8 Mobile Phone with Infrared Sensor (8GB), http://www.dhgate.com/meizu-m8-mobile-phone-with-infrared-sensor/p-ff808081243d4cc301244ea49dfa01e1.html, Feb. 3, 2010.

Wikipedia, Meizu M8, http://en.wikipedia.org/wiki/Meizu_8, Sep. 25, 2010.

Patently Apple, Apple Wins Key Multi-Touch Trackpad Patent, http://patentlyapple.com/patently-apple/2009/07/apple-wins-key-multi-touch-trackpad-patent.html, Jul. 2009.

Apple—Mac OS X Snow Leopard, Enhancements and Refinements, http://www.apple.com/macosx/refinements/enhancements-refinements.html, Feb. 13, 2010.

MOBEM, CE-Star Suite for Windows Mobile 5 & 6, Users Manual (www.mobem.com), Mar. 28, 2008, pp. 1-33, Version 2.8 R3c.

Examination report mailed Aug. 29, 2012, in corresponding European patent application No. 10188268.6.

Examination report mailed Jan. 23, 2013, in corresponding European patent application No. 10188268.6.

Office Action mailed Jul. 10, 2013, in corresponding Canadian patent application No. 2,755,461.

"What's behind new Blackberry optical trackpad" Dec. 22, 2009; retrieved on May 20, 2014; http://news.cnet.com/8301-17938 105-10420440-1.html.

Office Action mailed Feb. 25, 2014, in corresponding Canadian patent application No. 2,755,461.

\* cited by examiner

| Stroke Number | Input on Optical Trackpad Module 110 | Character Stroke Displayed |
|---|---|---|
| 0 | left-to-right input | horizontal character stroke |
| 1 | up-to-down input | vertical or diagonal character stroke |
| 2 | dot input | dot or left-to-right diagonal character stroke |
| 3 | down-to-up input | two character strokes in a cross shape |
| 4 | right-to-left input | three or more character strokes in which one character stroke intersects all others |
| 5 | a clockwise input | box-shape |
| 6 | left-to-down input | character stroke turns a corner |
| 7 | lower-right-to-upper-left input | Chinese character "八" and corresponding inverted form |
| 8 | counterclockwise input | Chinese character "亅" |
| 9 | upper-right-to-lower-left input | right-to-left diagonal or left hook character stroke |

Table 1

*FIG. 15*

CHARACTER INPUT METHOD

FIELD OF TECHNOLOGY

The subject matter herein generally relates to navigational inputs and in particular, to a character input method using a navigational input.

BACKGROUND

Mobile devices are becoming prolific and growth exponential. The market in western countries is saturated with mobile devices, but developing countries present great growth potential. What is more, western countries present growth opportunities for more advanced smart phones, which are becoming integrated into people's lives. Many developing countries use written languages with a large number of characters relative to the English Alphabet. Therefore, having independent keys for each character is difficult or impossible to implement on a device with a small form-factor.

Input devices for mobile communication devices have typically included at least a standard numeric keypad typical of well-known telephones. As mobile devices become more advanced, more sophisticated input devices can be used to improve input efficiency. For example, modern cellular devices can include QWERTY keypads, speech-to-text, touch screens, trackballs, optical trackpad assemblies and other input devices that allow a user to enter data.

An optical trackpad assembly typically includes an optical trackpad that can be positioned on the front surface of a handset, just below the display. An infrared light source located below the trackpad can emit infrared light towards the trackpad, and when a user places a finger on the trackpad, a sensor can detect the finger. The sensor can detect the user's finger by receiving infrared light that can be reflected off the user's finger. The handset can also determine the direction of motion of the user's finger on the trackpad, and the finger's motion can be translated into corresponding functions associated with the handset.

BRIEF DESCRIPTION OF THE DRAWINGS

Implementations of the present application will now be described, by way of example only, with reference to the attached Figures, wherein:

FIG. 15 illustrates a Table listing inputs associated with character strokes in accordance with an exemplary implementation.

DETAILED DESCRIPTION

Figure 1:
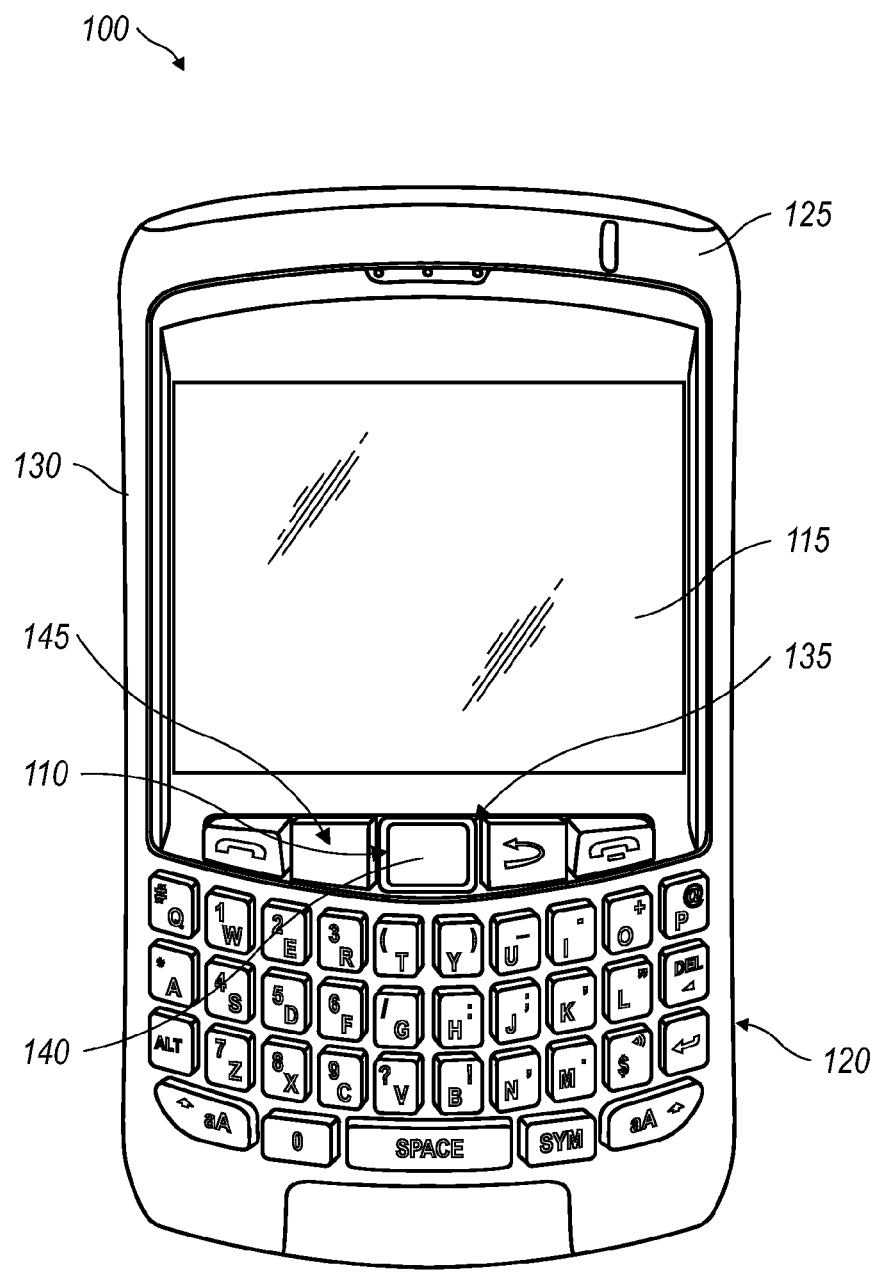
FIG. 1 illustrates a front view of a mobile device in accordance with an exemplary implementation.

For simplicity and clarity of illustration, where appropriate, reference numerals have been repeated among the different figures to indicate corresponding or analogous elements. In addition, numerous specific details are set forth to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations described herein.

The term "input object" is defined as matter used to input information, examples of input objects are a stylus, pen or finger. The term "navigational input" is defined as a module that provides one or more surfaces that can receive or engage an input object, which may or may not include direct physical contact, for purposes of allowing movements from the input object to be detected and processed. The terms "processor" and "processing unit" are defined as a component or a group of components that are capable of receiving input signals associated with movement at or on a navigational input, processing the input signals and selectively signaling other components to respond to such movements. A "sensor array" is defined as a collection of sensors that are capable of detecting reflected light signals and in response, generating corresponding electrical signals. The term "optically coupled" is defined as any connection that allows light to reach a target, which includes using air as the medium or some physical channel, such as a light guide, or a combination of both. A "translational movement" is defined as a movement that is substantially parallel over a predetermined distance. The term "highlight" is defined as emphasizing an object to differentiate from other objects.

As noted earlier, countries such as Japan, China, India, countries in Northern Africa and the Middle East present growth potential for the mobile communication industry. These countries have substantial populations using different written languages that linguists broadly classify as logographic, syllabic or alphabetic. However, these languages often contain aspects of each class and are referred to as complex systems. Mandarin, which is the official modern Chinese spoken language, is an example of a logographic language; Hindi, which is a commonly used Indian language, is an example of a complex alphasyllabary language; and Arabic and Urdu, are examples of alphabetic languages that typically have many more characters than the twenty-six of the English alphabet. Having too many characters can make dedicating a key to each character prohibitive. Moreover, dedicating keys of a mobile device to a single language can be inefficient if more than one language needs to be supported on a single device.

Incorporating navigational inputs, such as mechanical or optical trackpads or trackballs, with mobile devices can allow for a spectrum of user input options. For example, when utilizing these navigational inputs, users may be able to draw figures on the display of the mobile device. Furthermore, this disclosure illustrates implementations that allow for input of characters from written languages with a large number of characters, such as Chinese and Japanese.

In one implementation, character input can be accomplished via an optical trackpad module, which can include a light source that generates light and a trackpad that is optically coupled to the light source such that light from the light source can reach the trackpad and beyond. The trackpad can be configured to detect an input object, such as a finger. The optical trackpad module can also include a sensor array that can receive at least some of the light from the light source that is reflected off the input object. The sensor array can be divided into sub-sections, and each sub-section can correspond to a portion of the trackpad. In addition, each sub-section can be configured to detect at least translational movement of the input object on the corresponding trackpad portions to enable input of rotational inputs by the input object detected by the trackpad.

Referring to FIG. 1, an example of a mobile device 100 having navigational input, such as an optical trackpad module 110, is shown. In one arrangement, the mobile device 100 can include a display 115 and a keypad 120. The keypad 120 can include a keyfield having alphanumeric keys arranged in a keyboard layout, numeric keys, and other function keys. The keypad 120, instead of comprising physical buttons, can alternatively be a touch keypad that can be shown on the display 115 for touch-screen entry. The mobile device 100 can include a front surface 125 and a side surface 130 in which the side surface 130 can be substantially perpendicular to the front surface 125. As can be seen in FIG. 1, the front surface 125 can include the display 115, menu button 145 and the keypad 120, although these components may be positioned on other surfaces of the mobile device 100, if so desired. While in the illustrated implementation the mobile device 100 can be a handheld wireless communication device, the mobile device 100 can be any of the following: a personal digital assistant (PDA), a handheld electronic device, a non-handheld wireless communication device, a pager, a cellular phone, a cellular smart-phone, a wireless organizer, a wirelessly-enabled notebook computer and the like.

The optical trackpad module 110 can include a trackpad 135, which can have an outer surface 140. In one arrangement, the outer surface 140 of the trackpad 135, which can be used as a navigational input, can be positioned on top of, or flush with, the front surface 125 of the mobile device 100. In an alternative arrangement, the outer surface 140 of the trackpad 135 can be positioned on the side surface 130. The outer surface 140 of the trackpad 135 can be positioned at other suitable locations on the mobile device 100, such as a back surface of the device 100 (not shown), for example. In one particular example, the outer surface 140 can be substantially planar or flat. The outer surface 140, however, can have other suitable shapes such as circles, octagons, squares or rectangles.

As briefly indicated above, logographic characters, such as Chinese characters, can be input on a mobile device using a combination of key presses. For example, the CKC Chinese Input System uses ten characters (0-9) to identify different character strokes that can be used to construct a Chinese character. For example, 1 can represent a horizontal character stroke, 2 a vertical or diagonal character stroke, 3 a dot or left-to-right diagonal character stroke, 4 two character strokes in a cross shape, 5 three or more character strokes in which one character stroke intersects all others, 6 a box-shape, 7 where a character stroke turns a corner, 8 the shape of the Chinese character "八" and a corresponding inverted form, 9 the shape of the Chinese character "小" and a corresponding inverted form, and 0 a right-to-left diagonal or left hook character stroke. In one example, a character can then be constructed using four numbers, for example, 0760, which can identify the character "的". The numbers can then be entered using the keypad 120 and the corresponding Chinese character can then be input to a text application, such as an email application, word processor, or other applications requiring textual input.

The input method using digits 0-9 can be difficult to learn because it is not intuitive to associate digits with strokes. Therefore, there is a need for a more intuitive and easy-to-learn method of character input on a mobile device.

Figure 2:
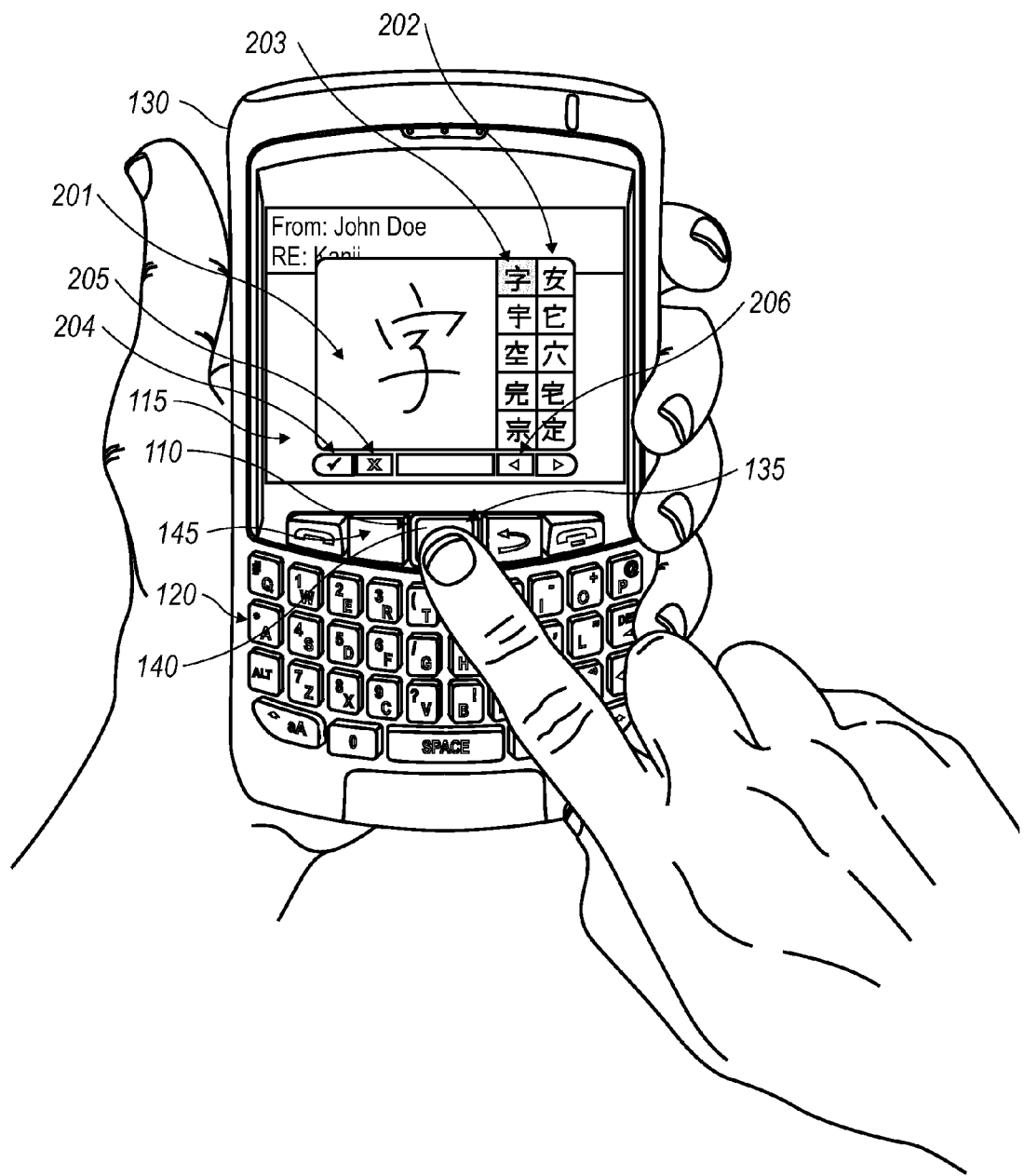
FIG. 2 illustrates a front view of the mobile device displaying an input method in accordance with an exemplary implementation.

FIG. 2 illustrates an implementation of a character input method running on the mobile device 100 in accordance with the present disclosure. The character input method can have a user interface that can be displayed on the display 115. The user interface includes a character drawing window 201 that can be displayed in the center of the display 115. A character suggestion window 202 can be displayed, but not limited to, the right of the character drawing window 201. The character suggestion window 202 can include one or more character suggestions based on input received from a user. The one or more characters of character suggestion window 202 can be presented in a column, a row, or a plurality of columns and rows. It should be understood that the character suggestion window 202 is not limited to such a configuration; for example, the characters in the suggestion window could be arranged in a circular arrangement. At least one of the characters in the character suggestion window 202 can be a highlighted character 203, which identifies a character determined by software to be the most likely candidate for the character desired. The highlighted character 203 can be changed via navigational inputs from the user, for example, each character can be associated with a different number 0-9, and activation of a key associated with a number will highlight a corresponding character in character selection window 202. A selection soft button 204 can be displayed below the character drawing window 201 on the display 115. The selection soft button 204 can include a checkmark and can be used for selecting the currently highlighted character in the character suggestion window 202. Similarly, a delete soft button 205 can be included to the right of the selection soft button 204. The delete soft button 205 can include an 'X' to signify deletion of the currently drawn character from character drawing window 201 to allow the user to begin anew. Additionally, symbol-selection soft buttons 206 can be included below character suggestion window 202. The symbol-selection soft buttons 206 can include left and right, or up and down symbols, which identify navigational directions to allow the user to change the highlighted character to another of the one or more character suggestions in character suggestion window 202. While the location of the various elements of the character input method are described above in detail as the elements are illustrated in FIG. 2, the locations are only exemplary and can be rearranged per design choice.

Figure 13:
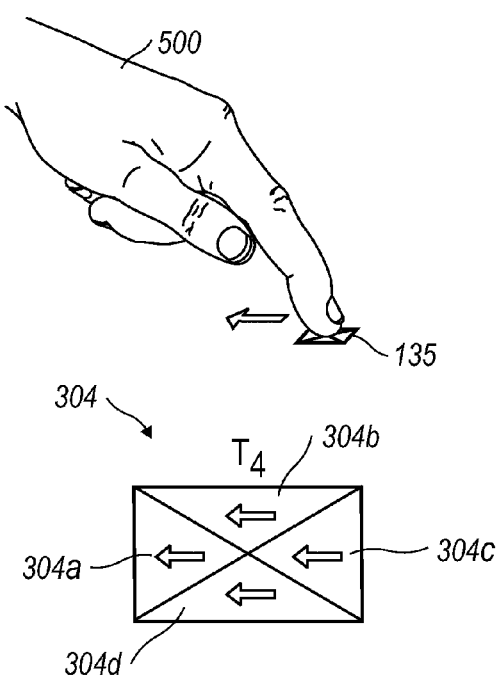
FIG. 13 illustrates yet another example of an input object on the trackpad in accordance with an exemplary implementation.
Figure 14:
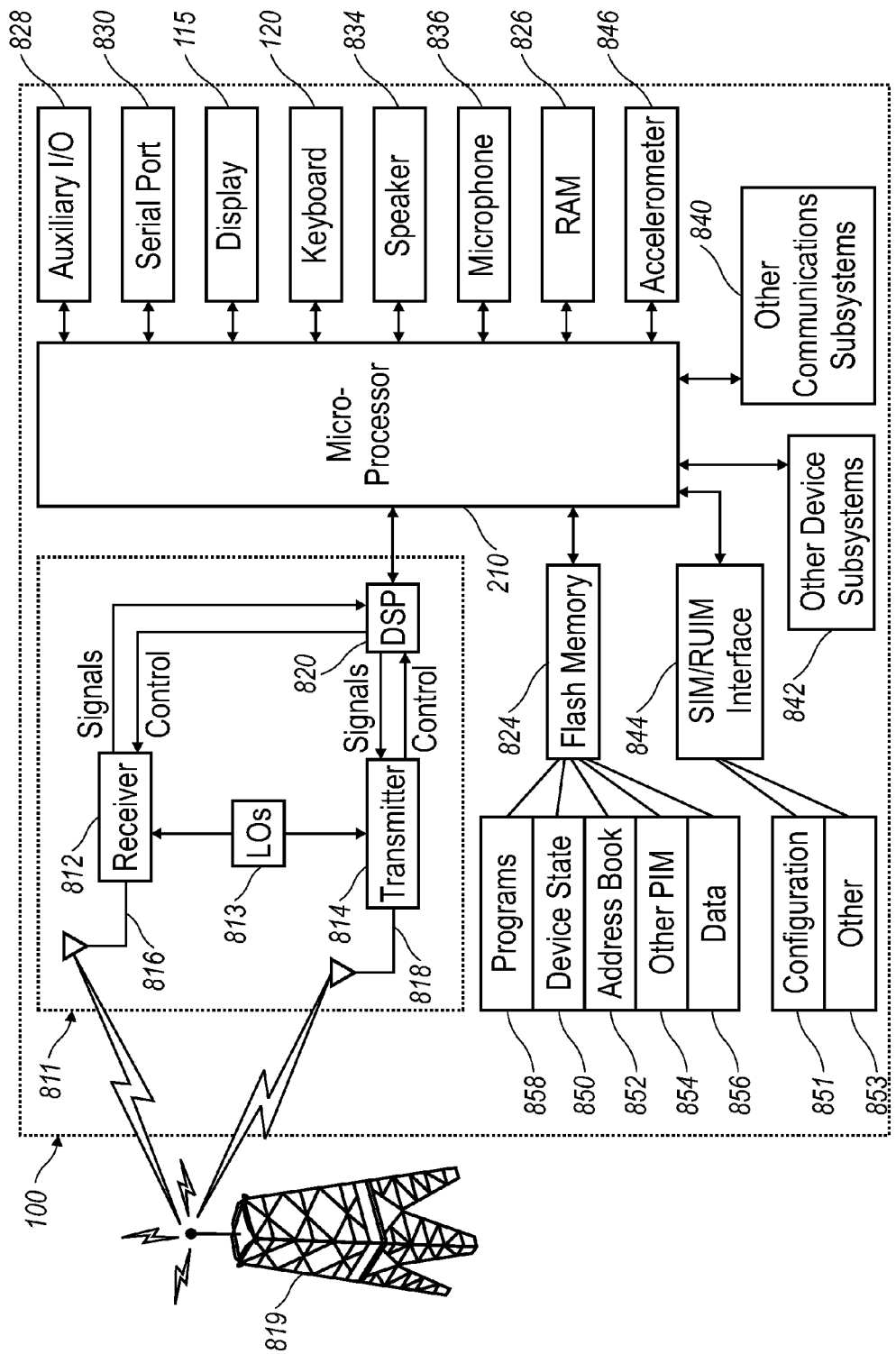
FIG. 14 illustrates a block diagram representing a handheld communication device interacting in a communication network in accordance with an exemplary implementation.

In addition, the optical trackpad module 110 can be used to input character strokes in an implementation of an input method for logographic characters, such as Chinese characters. The character input method of FIG. 2 can be similar to that of the CKC Chinese input system, which is available for download from http://www.ckcsys.com.hk. In the implementation of FIG. 2, different inputs over the optical trackpad module 110 can be associated with character strokes of a Chinese character. An exemplary listing of inputs and associated character strokes is listed in Table 1 as illustrated in FIG. 13.

These inputs on optical trackpad 110 are more intuitive than associating the character strokes with digits because the inputs are similar to actual strokes. Therefore, the inputs are easier for a user to learn because the inputs are more stroke-like than pressing buttons associated with digits.

Figure 3:
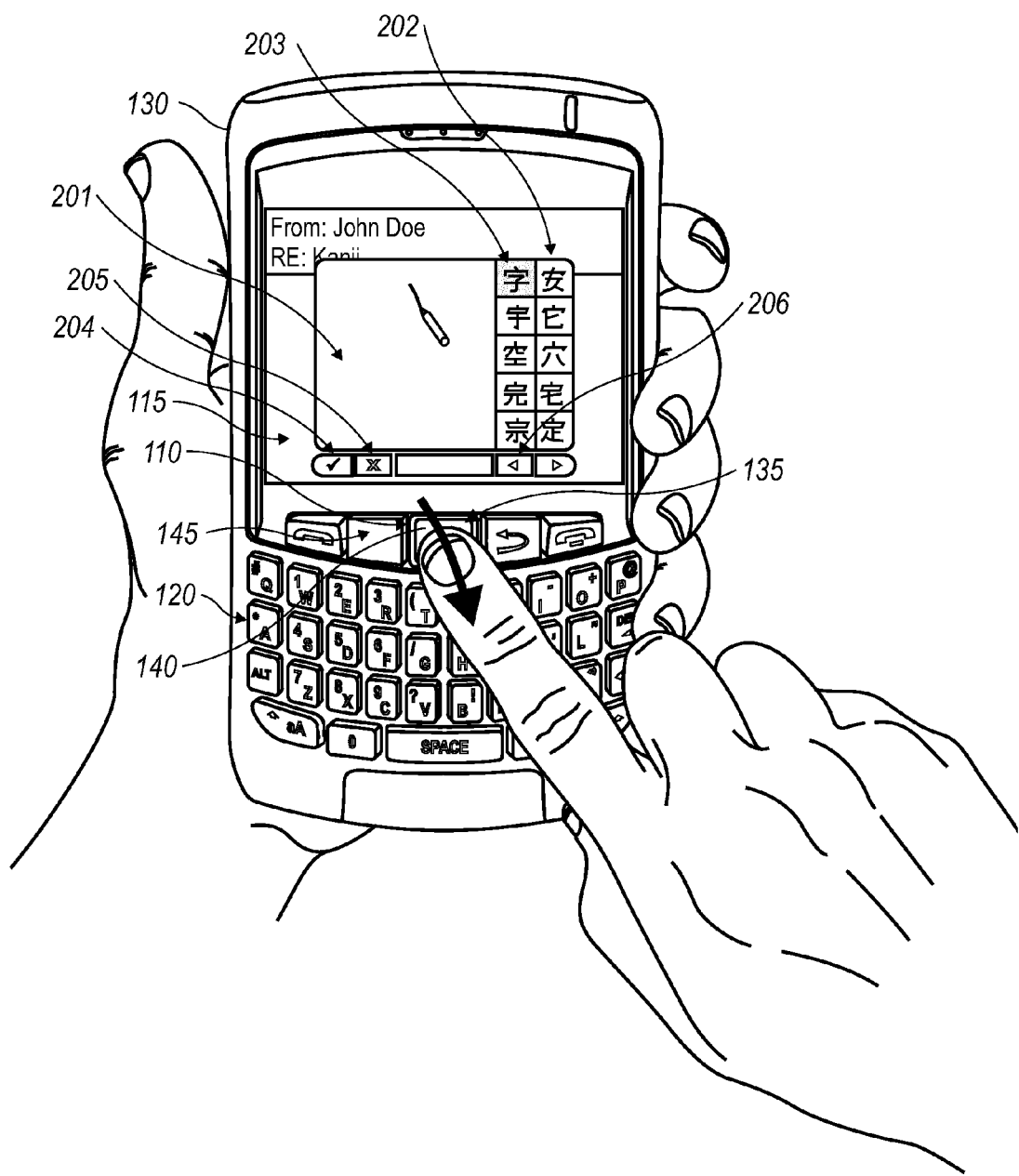
FIGS. 3-5 illustrate a series of screen displays comprising steps for inputting a character in accordance with an exemplary implementation.
Figure 4:
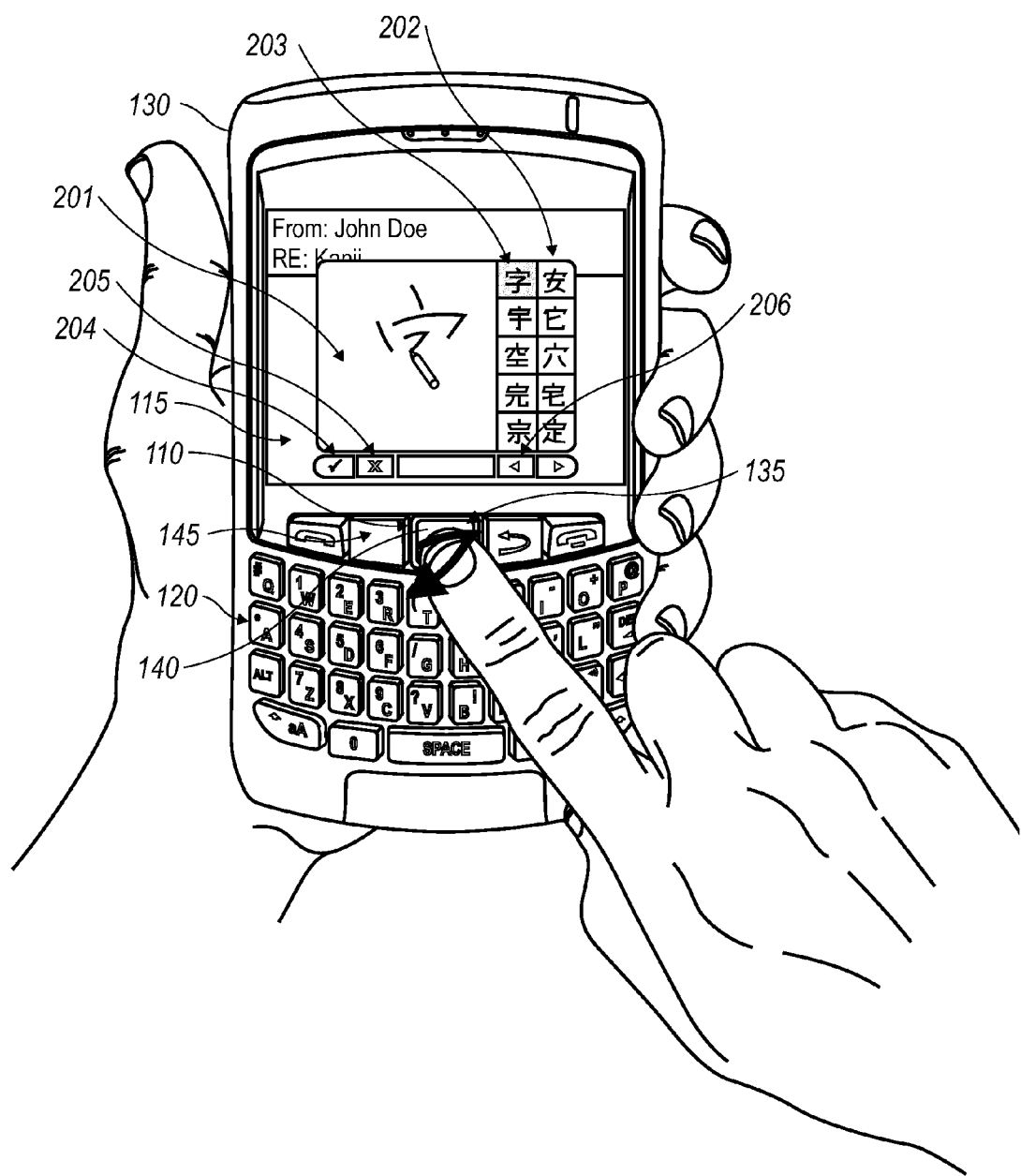
Figure 5:
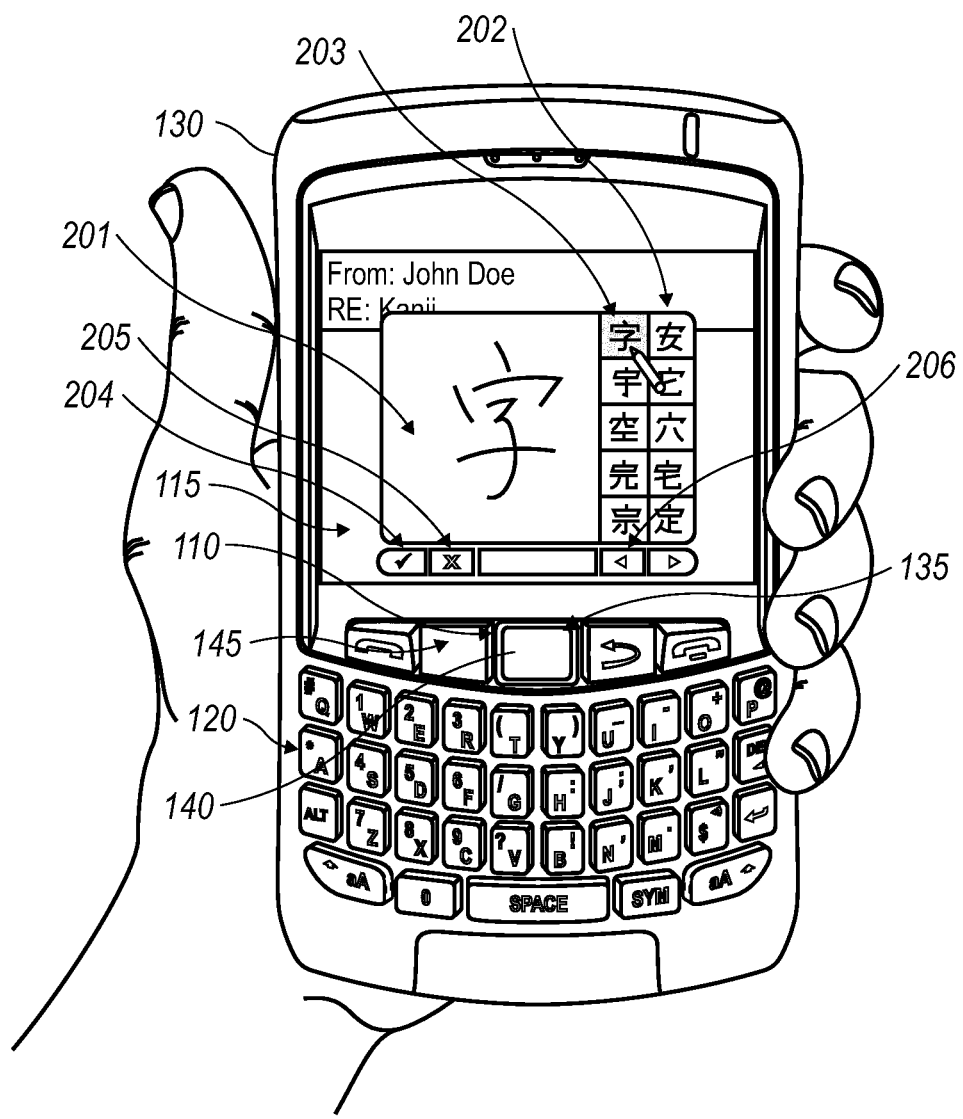

FIGS. 3-5 illustrate input method 300, according to an exemplary implementation, used to input the Chinese character 字 (zì), which means "character" in English and can be written using 6 character strokes. The exemplary implementation has advantages in that the inputs are similar to strokes used to write characters on paper, and are therefore easier to learn. FIG. 3 illustrates the user entering a dot input on trackpad 135 to represent an upper dot character stroke. Next, second dot, horizontal and left-hook inputs are made, which are depicted in current symbol window 202, but the motions are not illustrated on trackpad 135. FIG. 4 illustrates a left-to-right input followed by an upper-right-to-lower-left input to represent horizontal line and left-hook character strokes. After that, down-to-up, upper-right-to-lower-left and left-to-right inputs are made. Due to limited input space, entering character strokes accurately can be difficult; therefore, the character suggestion window 202 can be helpful to identify suggested characters based on input received from the user. In the example of FIG. 2, the mobile device 100 can suggest 字 in the character suggestion window 202. Finally, in FIG. 5, the user can depress trackpad 135 to select 字 and insert the character into a text application.

The input method 300 can use the well-known rules associated with Chinese characters to help determine the character being input to mobile device 100. For example, top character strokes come before bottom character strokes and left character strokes come before right character strokes. Using the well-known rules for Chinese characters, the input method 300 can guess at the location of the character stroke; for example, the first character stroke is likely meant to be located at the top or left of an intended character because character strokes at these locations come first.

In addition to support for Chinese characters, mobile device 100, and corresponding software installed thereon, can support other languages including English, Arabic, Urdu, Hindi, Spanish, Japanese and French. Therefore, the user of the device is not limited to one language. In fact, the user can dynamically switch between different languages, which can be useful when, for example, there is not a direct translation for a particular word and the user can be writing to another bilingual person. Language selection can be accomplished by, for example, activating a selection menu by actuating menu button 145 to display the selection menu and allow for selection of a language.

Figure 6:
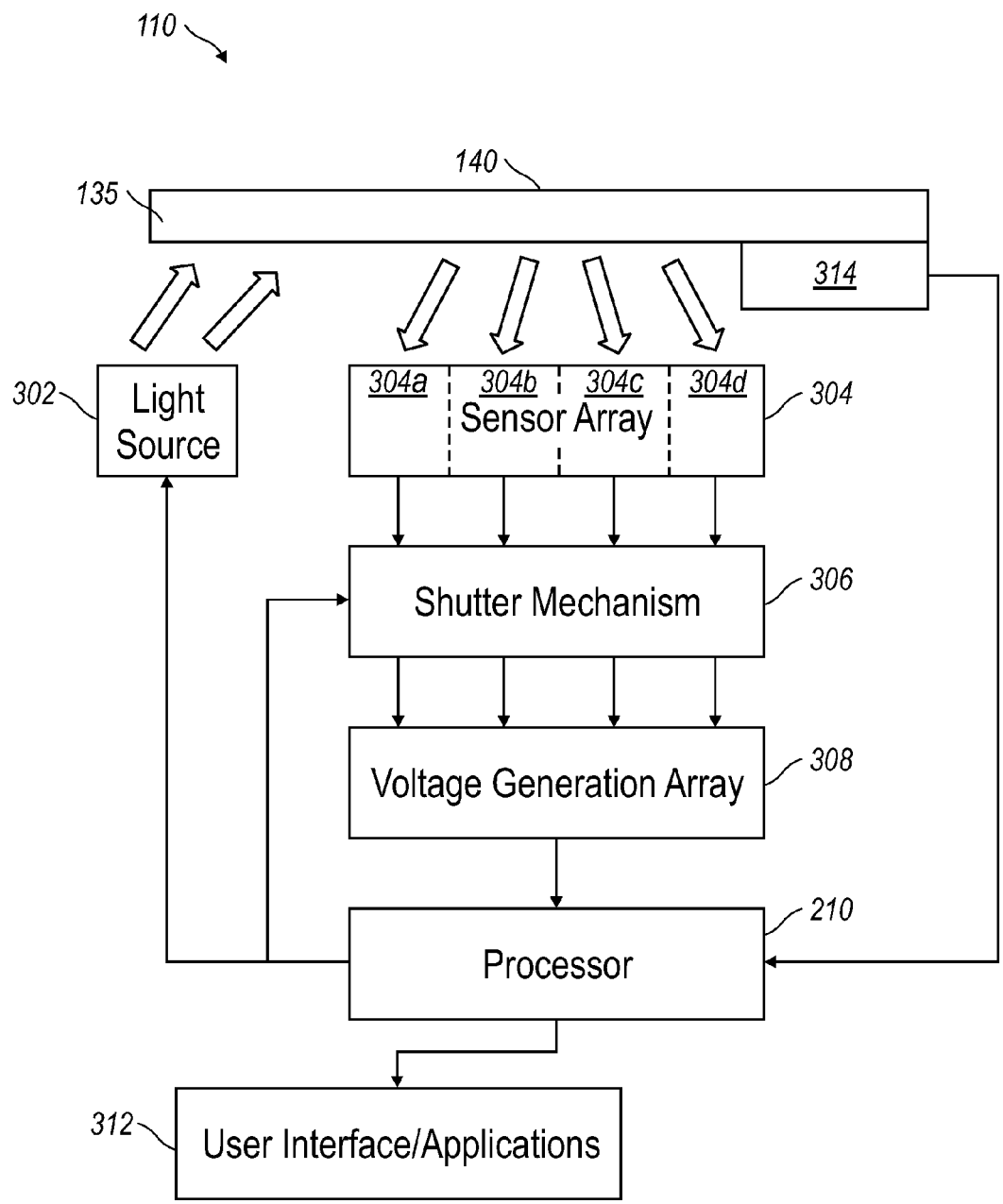
FIG. 6 illustrates a block diagram of an optical trackpad module in accordance with an exemplary implementation.

FIG. 6 illustrates an example of a block diagram of the optical trackpad module 110, which can be used to input character strokes and can be incorporated in the mobile device 100 of FIGS. 1 and 2. The optical trackpad module 110 can include the trackpad 135 and the outer surface 140, which is described above. In addition, the optical trackpad module 110 can include a light source 302, which can be optically coupled to the trackpad 135, and can include a sensor array 304. The light source 302 can emit light, and the light can reach the trackpad 135 and can be reflected off an input object (not shown). At least some of the light reflected off the input object can be received at the sensor array 304. In one arrangement, the light source 302 can generate light that can be outside the visible spectrum, although light of visible wavelengths may be used here. One example of non-visible light that can be generated by the light source 302 is, but is not limited to, infrared light.

As an example, the sensor array 304 can be divided into sub-sections 304a, 304b, 304c and 304d. As will be explained below, each of these sub-sections 304a-d can correspond to one or more portions of the trackpad 135. Each of these sub-sections 304a-d can also be configured to receive the light that can be reflected from the input object. Although four sub-sections 304a-d are illustrated here, the sensor array 304 can have any suitable number of sub-sections. An increase in the number of subsections can result in an increase in accuracy due to increased granularity of movement detection. However, for ease of discussion, the illustrated example can have four subsections. The sub-sections 304a-d can convert the received reflected light into electrical signals, which can be fed to a shutter component 306. The amplitude of these signals can be proportional to the amount of reflected light that can be received at the sub-sections 304a-d; for example, more received light can equal a higher amplitude.

The shutter component 306 can be communicatively coupled to a voltage generation array 308. These two components, which can be integrated or discrete, can work together to generate voltages that are proportional to the amount of light received at the sub-sections 304a-d of the sensor array 304. In one arrangement, the shutter component 306 can be an electrical component with no moving parts, if desired. For example, the shutter component 306 can repeatedly switch between an open electrical state and a closed electrical state to selectively permit electrical signals from the sensor array 304 to reach the voltage generation array 308. That is, when the shutter component 306 is in an open state, the signals from the sensor array 304 can enter the voltage generation array 308, where charges that are associated with the signal amplitudes can accumulate. When the shutter component 306 enters a closed state, however, the signals from the sensor array 304 can be prevented from reaching the voltage generation array 308, which can block further charge accumulation in that component. In one arrangement, the voltage generation array 308 can be a collection of capacitors, sense capacitors for example, although the array 308 can take the form of any other suitable components.

The voltage generation array 308 can multiplex and amplify the generated voltages and can convert the generated voltages to digital values. These digital values can then be fed to a processor 210. As will be explained below, the processor 210 can compare these values and can detect certain types of movement from the input object. Following the comparison, the processor 210 can signal a user interface/applications module 312, which can be part of the device programs 858, to cause certain corresponding actions to take place. Several examples of comparing received signals to predetermined movements stored in a database will be described later. The processor 210 can also control the operation of the light source 302 and the shutter component 306. For example, the processor 210 can signal the light source 302 to emit light on a periodic—as opposed to continuous—basis in an effort to reduce power consumption. As another example, the processor 210 can signal the shutter component 306 to increase or decrease the frame rate—the rate that shutter component 306 moves between open and closed states—to maintain a balance between better detecting the input object and conserving power.

Example processes of comparing data associated with received strokes with a database will now be presented. Referring back to FIG. 6, the light source 302 can emit light, which can be received at the trackpad 135. An input object (not shown), such as a user's finger, can be received by the trackpad 135. As an example, the input object can be physically placed or positioned on the outer surface 140 of the trackpad 135 for purposes of entering commands through the optical trackpad module 110. As another example of the trackpad 135 receiving the input object, the input object can be positioned above and near the outer surface 140 such that the object is not touching the outer surface 140 but can still cause corresponding actions to be performed on the mobile device 100.

Figure 7:
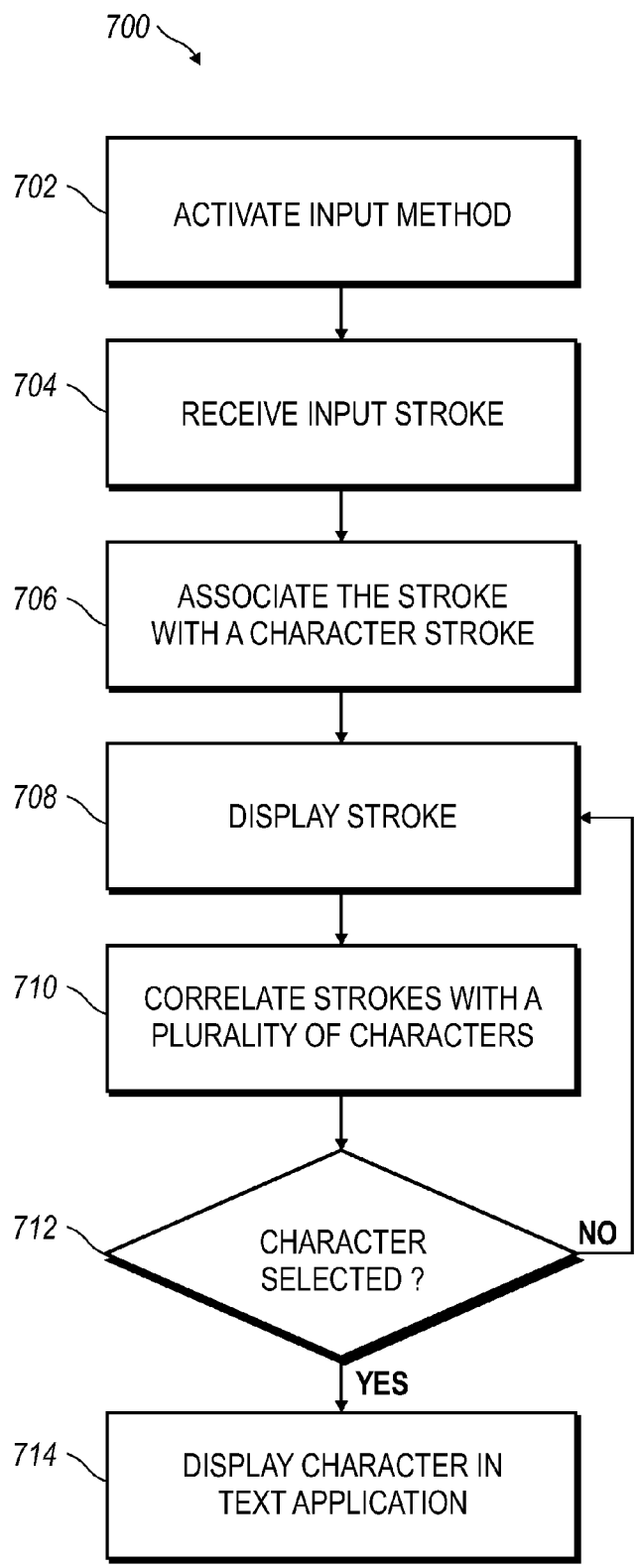
FIG. 7 illustrates a flow chart of an input method in accordance with an exemplary implementation.

FIG. 7 illustrates a flowchart 700 of a method of inputting a series of character strokes into a navigational input and associating the character strokes with a character. For example, a user can first activate the input method (step 702), such as the exemplary application of FIGS. 3-5. Next, the user can enter a first input via the optical trackpad module 110 (step 704). The received input can then be associated with one of the allowed character strokes which can be stored in a database of character strokes on the mobile device 100, which are listed above (step 706). Next, the character stroke can be displayed on the display 115 (step 708). The received character strokes can then be correlated to characters stored in a database of characters (step 710) and continue to update symbol suggestion window 202 as more inputs are received, thereby reducing the possible characters from which to choose. The database of character strokes and the database of characters can be combined or separated. If a character is selected (step 712), the character can be displayed in the text application, else, more inputs are received (step 714) to further define the desired character. One or more of these steps can be made using a processor or application-specific integrated circuit.

Figure 8:
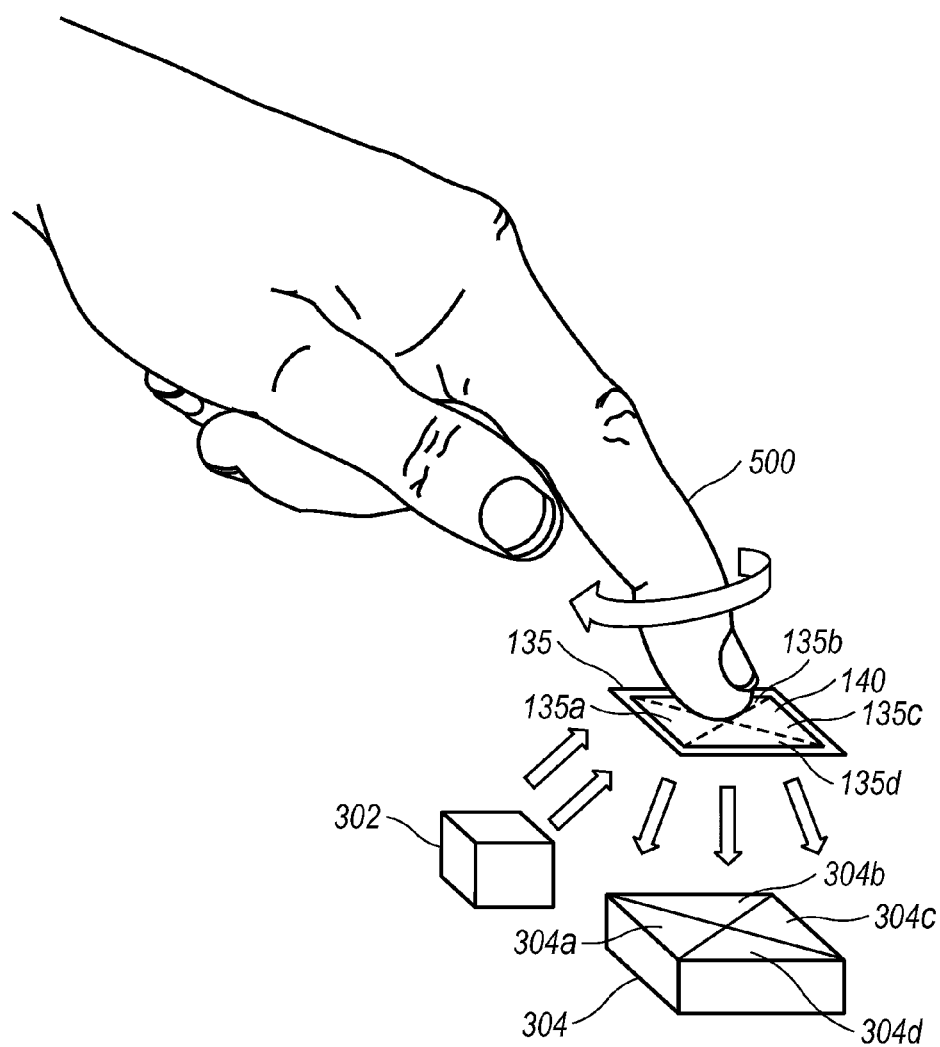
FIG. 8 illustrates an input object on a trackpad inputting a clockwise input in accordance with an exemplary implementation.
Figure 8:
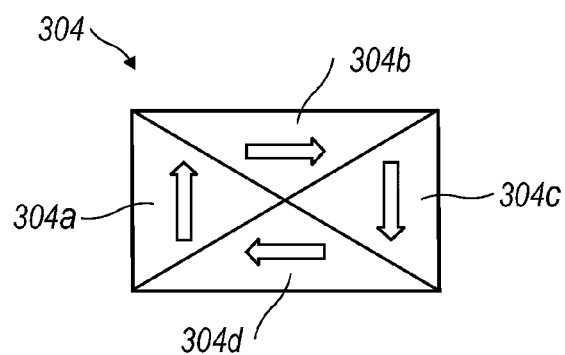

Referring to FIG. 8, an example of an input object 500 positioned on the outer surface 140 of the trackpad 135 is shown. In the example of FIG. 8, the input object 500 can be a user's finger. Light from the light source 302 can reflect off the user's finger and can be received at the sensor array 304. The arrows from the light source 302 and from the trackpad 135 can represent the light from light source 302. The sub-sections 304a-d can receive the reflected light. Here, the user's finger can be moved in a clockwise input, as depicted by the arrow.

Each of the sub-sections 304a-d can correspond to a portion 135a-d of the trackpad 135 such that a rotational input of the user's finger can cause translational movements to be detected in one or more of the sub-sections 304a-d. A top view of the sensor array 304 can be illustrated in which arrows representing exemplary detected translational movements can be seen. That is, the rotational inputs of the input object 500 on the trackpad 135 can be detected in the sub-sections 304a-d. The processor 210 can then receive information from the sub-sections 304a-d and compare these detected translational movements to each other, and based on the comparison, the processor 210 can detect the rotational input of the input object 500 and the direction of the movement. The term "rotational input" is defined as an act of moving an object around an axis and includes substantially circular movements or discrete translational movements that, when combined, simulate a substantially circular movement.

Based on the operation of the shutter component 306, the processor 210 can detect slight changes in the translational movements over time. Also as part of the comparison, the processor 210 can detect translational movements on the input object 500 that are opposite to one another. For example, the processor 210 can determine that the translational movements detected in sub-sections 304a and 304c are in substantially opposite directions, in addition to the translational movements of sub-sections 304b and 304d. Moreover, the processor 210 can also determine the direction of rotation, which, as illustrated in FIG. 8, can be substantially clockwise.

Figure 9:
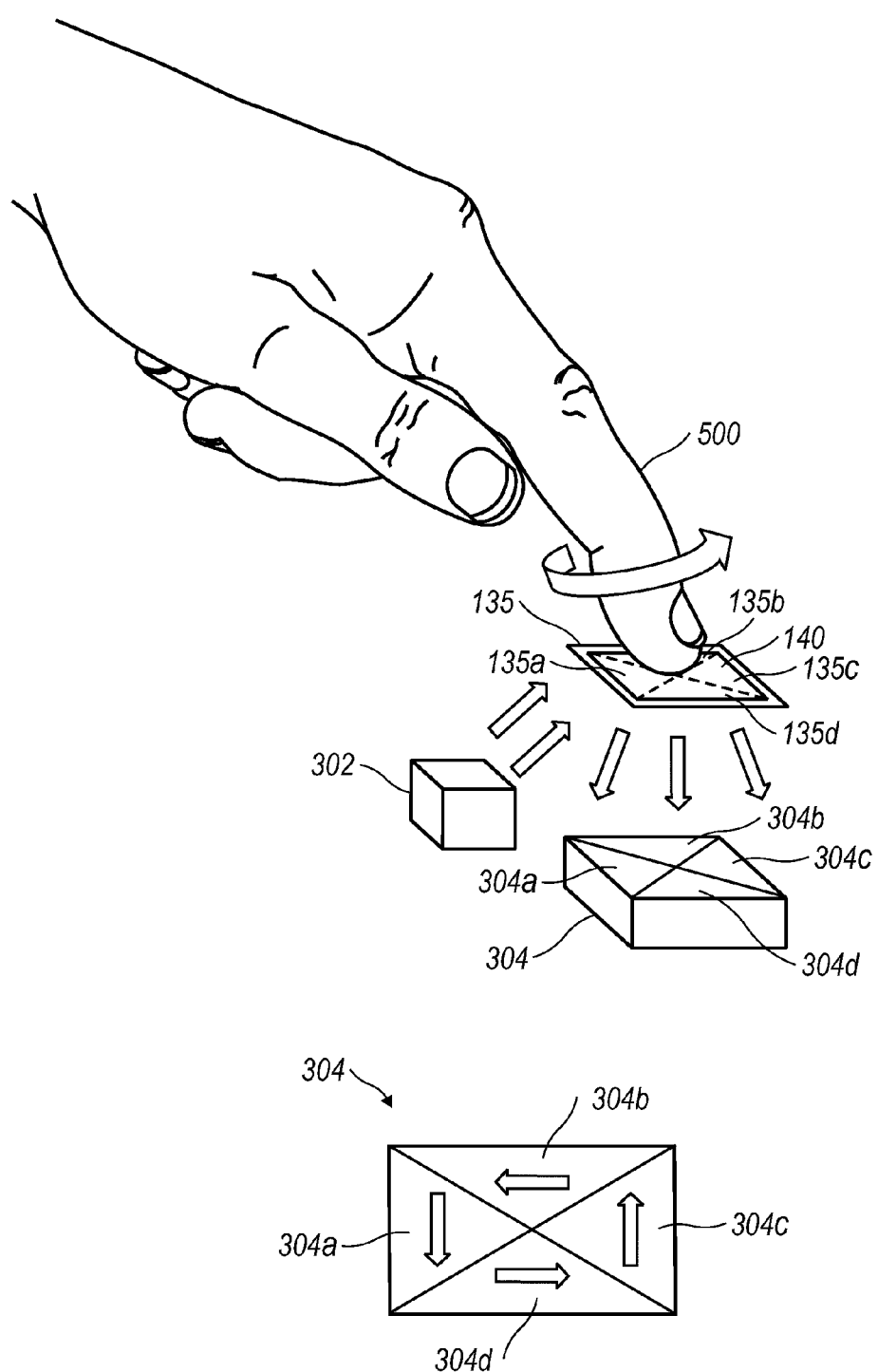
FIG. 9 illustrates an input object on the trackpad inputting a counter-clockwise input in accordance with an exemplary implementation.
Figure 10:
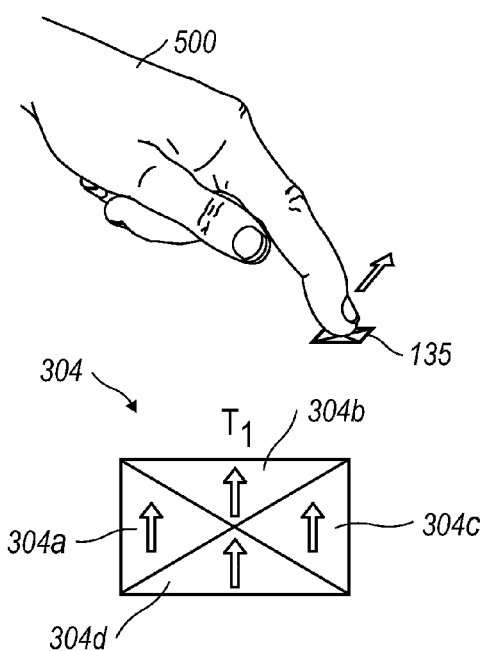
FIG. 10 illustrates one example of an input object on the trackpad in accordance with an exemplary implementation.
Figure 11:
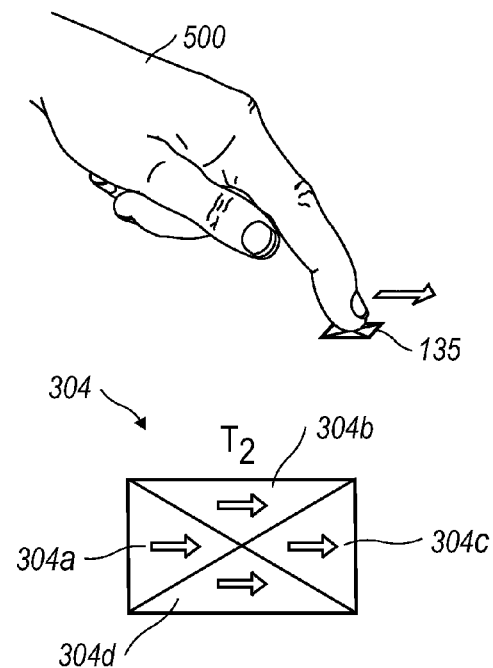
FIG. 11 illustrates another example of an input object on the trackpad in accordance with an exemplary implementation.

Referring to FIG. 9, an example of the input object 500 being rotated in a counter-clockwise (CCW) input can be illustrated. Here, the rotational input of the object 500 on the trackpad 135 can lead to translational movements being detected in the sub-sections 304a-d of the sensor array 304, similar to the process described above in relation to FIG. 8. In FIG. 9, however, the translational movements detected in the sub-sections 304a-d are in directions that are substantially opposite to the translational movements of the example described above, in view of the CCW input. As described earlier, the processor 210 can detect the rotational input and determine the rotational input's direction, in this case, CCW.

As can be seen in either FIG. 8 or 9, the sensor array 304 can include a number of sub-sections 304a-d, which can correspond to portions 135a-d of the trackpad 135. For example, sub-section 304a can correspond to trackpad portion 135a, while sub-section 304b can correspond to portion 135b and so on. In these examples, the sub-sections 304a-d can be essentially aligned with the corresponding portions 135a-d of the trackpad. As such, the number of sub-sections 304a-d of the sensor array 304 can be equal to the number of corresponding portions 135a-d of the trackpad 135. As a specific example, the optical trackpad module 110 can include four sub-sections 304a-d and four corresponding portions 135a-d. However, the optical trackpad module 110 can include any suitable number of sub-sections and any suitable number of trackpad portions, and the number of these components need not be equal. For example, one sub-section of the sensor array 304 can be responsible for detecting movements in two or more corresponding portions of the trackpad 135.

FIGS. 10-13 illustrate another example of how a rotational input can be detected at the trackpad 135. Similar to FIGS. 8 and 9, a top view of the sensor array 304 with the sub-sections 304a-d can be shown here, although four such views are part of this drawing. Each of the top views of the sensor array 304 displays arrows that represent translational movement of an input object over the trackpad portions 135a-d corresponding to the sub-sections 304a-d. As an example, the input object 500 can be the finger shown in FIGS. 8 and 9. For each top view, the corresponding input by the input object 500 (finger) that can generate the arrows on the sub-sections 304a-d can be positioned next to the relevant top views.

Each top view of the sensor array 304 can have a relevant time stamp, $T_1$-$T_4$. These time stamps can represent sequential periods of time in which a certain type of translational movement can be detected on the trackpad 135 at a particular time. For example, at time $T_1$, the user can move a finger in a translational manner in an up direction (towards the display 115 of FIG. 1) over the trackpad portions 135a-d. A short time later at time $T_2$, the user can move a finger towards the right, followed by a subsequent downward translational movement at time $T_3$. Finally, the user can move a finger across the trackpad portions 135a-d towards the left at subsequent time $T_4$. The processor 210 can sequentially detect this series of translational movements over the trackpad 135 over the period of time (times $T_1$-$T_4$) to determine that the user wishes to initiate some action that can be associated with a rotational input. That is, the distinct and sequential translational movements described above can be recognized as a rotational input, and a subsequent action that can associate the rotational input with a character stroke can be executed. As such, a rotational input includes either a substantially circular movement or a series of translational movements that combine to form a substantially circular movement of the object.

In addition to the rotational movement just described, any one of the movements illustrated at times $T_1$-$T_4$ can be made independent and separate from each other to form a translational input. For example, the upward movement at time $T_1$ can be singularly input to signify a down-to-up input. In another example, the user can make a translational diagonal movement to make a diagonal input. Therefore, any of the inputs described in Table 1 can be input using trackpad 135.

In addition to receiving inputs, the optical trackpad module 110 can serve as a user interface for various controls. For example, referring to FIGS. 1, 2, and 10, if the mobile device 100 can be equipped with a media application and a text application, such as email (both of which can be part of the user interface/applications module 312, which can reside in programs 858), the trackpad module 110 can be used to adjust parameters of these applications based on detected rotational input of the input object 500. A media application can be any combination of hardware and software that can be used to play media files, such as MP3 or MPEG files. In such an arrangement, a user of the mobile device 100 may rotate a finger to adjust the volume of a media file or to control the playback of such a file, for example. The processor 210 can signal the appropriate components once the processor 210 detects the relevant rotational input. Additionally, because the optical trackpad module 110 can include a depression detection component 314, the user can also enter commands by pressing down on the trackpad 135. For example, the user can activate depression detection component 314 by pressing down on the trackpad 135 to enter a "pause" command for a media player. In another example, a user can select one of a plurality of characters on the screen. Prior to being selected, the selected character can be highlighted in the character suggestion window 202 to identify the character as being selectable.

As another example, the user may rotate a finger to control a function of a camera application. A camera application can be any combination of hardware and software that can be used to operate a camera or some other imaging device. In particular, a user can rotate a finger to control a zoom feature of the camera application. In addition, the user can depress the trackpad 135 to cause an image to be captured by the camera application. Once the trackpad 135 detects the rotational input or pressing force, the processor 210 can signal the appropriate component(s) to take the relevant action associated with the detected movement or force.

Although several examples concerning the use of media, character input, or camera applications have been described, the optical trackpad module 110 can provide a user interface to numerous other applications or components. Furthermore, in view of this arrangement, buttons or keys that have been separately dedicated to operation of applications on the mobile device 100 can be eliminated, resulting in less space requirements and lower expenses. For example, side buttons that would normally be positioned on the mobile device 100 may no longer be desired, and by removing the side buttons, less space can be needed on the printed circuit board for volume control.

Figure 12:
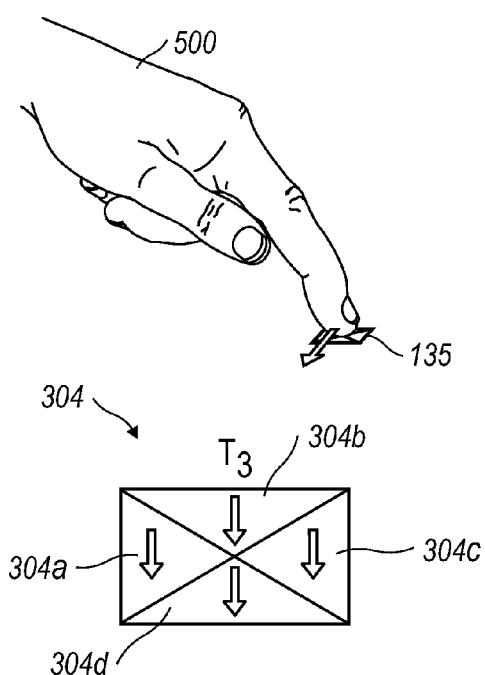
FIG. 12 illustrates another example of an input object on the trackpad in accordance with an exemplary implementation.

The block diagram of FIG. 12 representing communication device 100 interacting in the communication network 819 shows the inclusion of the microprocessor 210 which controls the operation the device 100. Communication subsystem 811 can perform all communication transmission and reception with wireless network 819. Microprocessor 210 can further connect with auxiliary input/output (I/O) subsystem 828, serial port (for example, a Universal Serial Bus port) 830, display 115, keyboard 120, speaker 834, microphone 836, random access memory (RAM) 826, and flash memory 824. Other communication subsystems 840 and other device subsystems 842, such as accelerometer 846 are generally indicated as connected to the microprocessor 210 as well. An example of communication subsystem 840 can be that of a short range communication subsystem such as a BLUETOOTH® communication module or an infrared device and associated circuits and components. Additionally, microprocessor 210 can perform operating system functions and can enable execution of programs 858 on communication device 100.

The above-described auxiliary I/O subsystem 828 can take a variety of different subsystems including a navigation tool such as the above-described optical trackpad module 110. The navigation tool can also or alternatively include a trackpad-based device, a thumbwheel, navigation pad, touch interface, tactile feedback button, joystick, or the like. These navigation tools can be located on the front surface of device 100 but may be located on an alternative exterior surface of the device 100. Other auxiliary I/O devices can include external display devices and externally connected keyboards (not shown). While the above examples have been provided in relation to the auxiliary I/O subsystem, other subsystems capable of providing input or receiving output from the mobile device 100 are considered within the scope of this disclosure. Additionally, other keys may be placed along the side of the device 100 to function as escape keys, volume control keys, scrolling keys, power switches, or user-programmable keys.

In an exemplary implementation, flash memory 824 can be enabled to provide a storage location for the operating system, device programs, and data. While the operating system in an implementation can be stored in flash memory 824, the operating system in other implementations can be stored in read-only memory (ROM) or a similar storage element (not shown). As those skilled in the art will appreciate, the operating system, device application or parts thereof may be loaded in RAM 826 or other volatile memory.

In an implementation, flash memory 824 can contain programs/applications 858, such as text applications, for execution on device 100 including address book 852, personal information manager (PIM) 854, and device state 850. Furthermore, programs 858 and other information 856 including data can be segregated upon storage in flash memory 824 of the device 100.

When communication device 100 can be enabled for two-way communication within wireless communication network 819, communication device 100 can send and receive signals from a mobile communication service. Examples of communication systems enabled for two-way communication include, but are not limited to, GPRS (General Packet Radio Service) network, UMTS (Universal Mobile Telecommunication Service) network, EDGE (Enhanced Data for Global Evolution) network, and CDMA (Code Division Multiple Access) network and those networks generally described as packet-switched, narrowband, data-only technologies mainly used for short burst wireless data transfer. For the systems listed above, communication device 100 can be enabled to transmit and receive signals from communication network 819. Other systems may not require such identifying information. GPRS, UMTS, and EDGE can require the use of a SIM (Subscriber Identity Module) to allow communication with the communication network 819. Likewise, most CDMA systems can require the use of a RUIM (Removable Identity Module) in order to communicate with the CDMA network. The RUIM and SIM card can be used in multiple different communication devices 100. Communication device 100 may be able to operate some features without a SIM/RUIM card, but device 100 may not be able to communicate with the network 819. A SIM/RUIM interface 844 located within device 100 allows for removal or insertion of a SIM/RUIM card (not shown). The SIM/RUIM card features memory and holds key configurations 851, and other information 853 such as identification and subscriber related information. With a properly enabled communication device 100, two-way communication between communication device 100 and communication network 819 can be possible.

If the communication device 100 can be enabled as described above or the communication network 819 does not require such enablement, two-way communication-enabled device 100 can be able to both transmit and receive information from communication network 819. The transfer of communication can be from device 100 or to device 100. To communicate with communication network 819, device 100, in one implementation, can be equipped with an integral or internal antenna 818 for transmitting signals to communication network 819. Likewise, in one implementation, communication device 100 can be equipped with another antenna 816 for receiving communication from communication network 819. These antennae (816, 818) in another implementation can be combined into a single antenna (not shown). As one skilled in the art would appreciate, the antenna or antennae (816, 818) can be externally mounted on device 100 in another implementation.

When equipped for two-way communication, communication device 100 can feature communication subsystem 811. As is well known in the art, communication subsystem 811 can be modified to support the operational needs of device 100. Subsystem 811 can include a transmitter 814 and receiver 812 including the associated antenna or antennae (816, 818) as described above, local oscillators (LOs) 813, and a processing module 820 which in one implementation can be a digital signal processor (DSP) 820.

This disclosure contemplates that communication by device 100 with wireless network 819 can be any type of communication that both wireless network 819 and device 100 are enabled to transmit, receive and process. In general, these can be classified as voice and data. Voice communication is communication in which signals for audible sounds are transmitted by device 100 the communication network 819. Data is all other types of communication that device 100 is capable of performing within the constraints of wireless network 819.

Portions of the mobile device 100 and supporting components can take the form of hardware elements, software elements or elements containing both hardware and software. In one implementation, the software portions can include, but are not limited to, firmware, resident software, microcode, etc. Furthermore, these software portions can take the form of a computer program product accessible from a computer-usable or computer-readable medium providing program code for use by, or in connection with, a computer or any instruction-executing system. For the purposes of this description, a computer-usable or computer-readable medium can be any apparatus that can contain, store, communicate, propagate, or transport the program for use by, or in connection with, the instruction-executing system, apparatus, or device. The medium can be an electronic, magnetic, optical, or semiconductor system (or apparatus or device) or a propagation medium (though propagation mediums as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD. Both processors and program code for implementing each as aspect of the system can be centralized or distributed (or a combination thereof) as known to those skilled in the art. Furthermore, the input method 300 can either be pre-loaded onto device 100 or downloaded separately as what is known as an app, for example, an application downloaded over the Internet that is not necessarily pre-loaded onto a mobile device. In other implementations, input method 300 can be integrated into text applications, such as email, for use only in the email application.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. I/O devices (including but not limited to keyboards, displays, pointing devices, etc.) can be coupled to the system either directly or through intervening I/O controllers.

Using the system, method and apparatus disclosed herein, the user can input logographic characters more naturally into a mobile device of limited size. For example, the user can input character strokes that the user is already familiar with, as opposed to inputting information via a standard 12-digit telephone keypad. In addition, the computer-readable instructions for comparing character strokes to a database of characters can efficiently correlate received character strokes to a database of characters, which in some cases, can reduce the number of character strokes required to input a character because the instructions can determine the desired character before all the character strokes are input.

Examples have been described above regarding an optical trackpad module and method of using same. Various modifications to and departures from the disclosed implementations will occur to those having skill in the art. The subject matter that is intended to be within the spirit of this disclosure is set forth in the following claims.

We claim:

1. A method of operating a communications device having a display and a trackpad with an outer surface, a light source, and an optical sensor array provided below the outer surface for receiving light emitted from the light source, the optical sensor array including a plurality of sub-sections, the method comprising:

transmitting, via a processor, a first signal to cause the light source of the trackpad to emit light, the light source having a different wavelength than a light source of the display;

detecting, at the optical sensor array, the emitted light of the trackpad reflected from an object positioned on or above the outer surface of the trackpad;

detecting translational movements of the object over selected ones of the plurality of sub-sections during a predetermined time sequence, the detected translational movements indicating a rotational input when the selected ones of the plurality of sub-sections include substantially opposite translational movements;

associating, via the processor, the detected translational movements with character strokes stored in a first database;

correlating, via the processor, the character strokes to a plurality of characters stored in a second database;

determining, via the processor, a selected character from one of the plurality of characters via a selection received from the trackpad; and rendering the selected character on the display.

2. The method according to claim 1, further comprising rendering a subset of the plurality of characters on the display.

3. The method according to claim 2, further comprising highlighting at least one character of the subset of the plurality of characters.

4. The method according to claim 3, further comprising obtaining an activation signal corresponding to activation of a depression detection component coupled to the trackpad, selection of the highlighted character being enabled upon detection of a depression of the trackpad by the depression detection component.

5. The method according to claim 1, wherein the plurality of characters stored in the second database comprises characters from two or more languages.

6. The method according to claim 1, wherein the trackpad is an optical trackpad.

7. The method according to claim 1, wherein the plurality of characters stored in the second database comprises logographic characters.

8. The method according to claim 1, wherein the first database and the second database constitute a single database.

9. A communications device comprising:

a processor;

a display communicatively coupled to the processor, the display having a top surface defining a viewing plane;

a trackpad communicatively coupled to the processor, the trackpad having:

an outer surface provided on the viewing plane;

a light source provided below the viewing plane, the light source having a different wavelength than a light source of the display; and an optical sensor array provided below the viewing plane for receiving light emitted from the light source of the trackpad, the optical sensor array including a plurality of sub-sections; and a memory having stored therein instructions which, when executed by the processor, cause the processor to:

transmit a first signal to cause the light source of the trackpad to emit light;

detect, at the optical sensor array, the emitted light of the trackpad reflected from an object positioned above the viewing plane on or above the outer surface of the trackpad;

detect translational movements of the object over selected ones of the plurality of sub-sections during a predetermined time sequence, the detected translational movements indicating a rotational input when the selected ones of the plurality of sub-sections include substantially opposite translational movements;

associate the detected translational movements with character strokes stored in a first database;

correlate the character strokes to a plurality of characters stored in a second database;

determine a selected character from one of the plurality of characters via a selection received from the trackpad; and render the selected character on the display.

10. The communications device of claim 9, wherein the memory further stores therein instructions which, when executed by the processor, causes the processor to render a current character window and a character suggestion window on the display.

11. The communications device of claim 10, wherein the memory further stores therein instructions which, when executed by the processor, causes the processor to highlight one character of a plurality of characters in the character suggestion window on the display.

12. The communications device of claim 11, further comprising a depression detection component coupled to the trackpad, and wherein the memory further stores therein instructions which, when executed by the processor, causes the processor to obtain an activation signal corresponding to activation of the depression detection component, selection of the highlighted character of the plurality of characters being enabled upon detection of a depression of the trackpad by the depression detection component.

13. The communications device of claim 9, wherein the trackpad is an optical trackpad.

14. The communications device of claim 10, wherein the character suggestion window comprises a plurality of characters corresponding to the character strokes and the plurality of characters comprises logographic characters.

15. The communications device of claim 9, wherein the first database and the second database constitute a single database.

16. The communications device of claim 9, wherein the processor detects translational movements of the object separately for each sub-section, the separately detected translational movements being combined for comparison to the character strokes stored in the first database.

17. A non-transitory computer-readable medium for a communications device having a display and a trackpad with an outer surface, a light source, and an optical sensor array provided below the outer surface for receiving light emitted from the light source, the optical sensor array including a plurality of sub-sections, the computer-readable medium including computer instructions stored thereon such that, when executed, cause the communications device to:

transmit a first signal to cause the light source of the trackpad to emit light, the light source having a different wavelength than a light source of the display;

detect, at the optical sensor array, the emitted light of the trackpad reflected from an object positioned on or above the outer surface of the trackpad;

detect translational movements of the object over selected ones of the plurality of sub-sections during a predetermined time sequence, the detected translational movements indicating a rotational input when the selected ones of the plurality of sub-sections include substantially opposite translational movements;

associate the detected translational movements with character strokes stored in a first database;

correlate the character strokes to a plurality of characters stored in a second database;

determine a selected character from one of the plurality of characters via a selection received from the trackpad; and render the selected character on the display.

18. The non-transitory computer-readable medium according to claim 17, further comprising computer instructions such that, when executed, cause the communications device to render a subset of the plurality of characters on the display.

19. The non-transitory computer-readable medium according to claim 18, further comprising computer instructions such that, when executed, cause the communications device to highlight one character of the subset of the plurality of characters.

20. The non-transitory computer-readable medium according to claim 17, wherein the plurality of characters stored in the second database comprises characters from two or more languages.

21. The non-transitory computer-readable medium according to claim 17, wherein the trackpad is an optical trackpad.

22. The non-transitory computer-readable medium according to claim 17, wherein the plurality of characters are logographic characters.

23. The non-transitory computer-readable medium according to claim 17, wherein the first database and the second database constitute a single database.

* * * * *